Aug. 23, 1938. R. E. DAY 2,127,767
PISTON
Filed Oct. 14, 1935
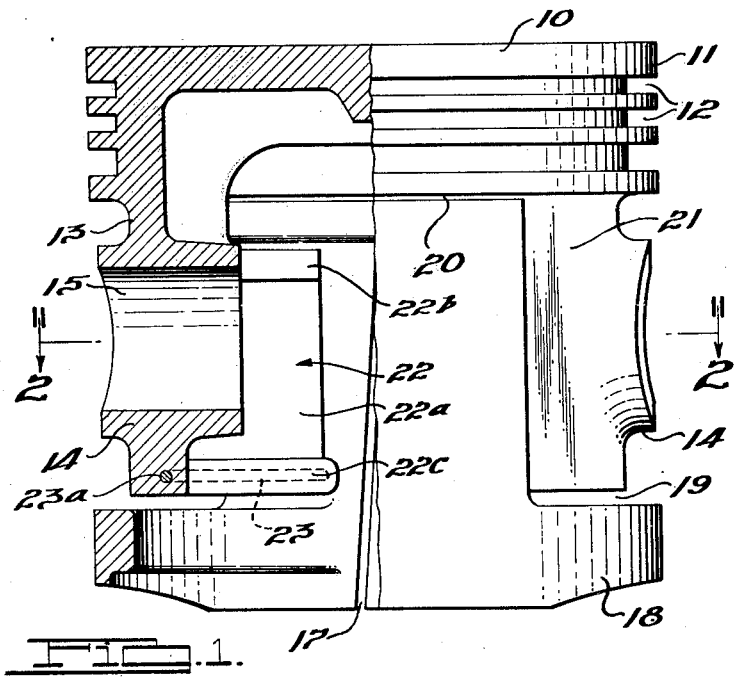
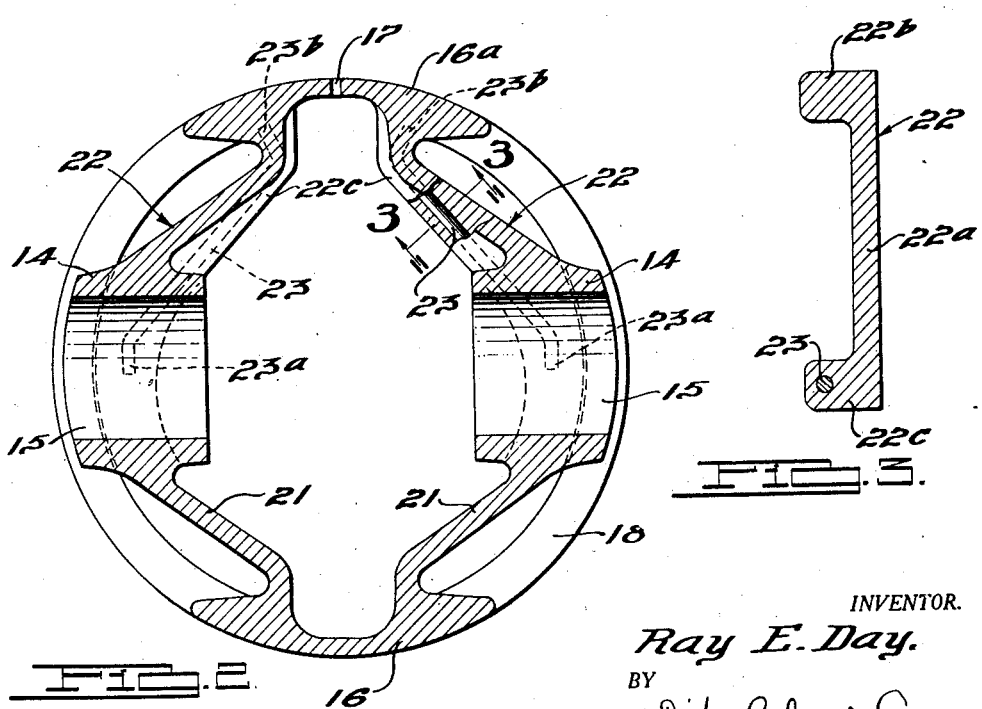
INVENTOR.
Ray E. Day.
BY
Dike, Calver & Gray
ATTORNEYS.

Patented Aug. 23, 1938

2,127,767

UNITED STATES PATENT OFFICE 2,127,767

PISTON

Ray E. Day, Detroit, Mich.

Application October 14, 1935, Serial No. 44,865

7 Claims. (Cl. 309—13)

This invention relates to pistons for internal combustion engines, an object of the invention being to provide a piston which may be fitted closely within the engine cylinder and embodying improved means for controlling the diameter of the skirt so as to maintain a substantially uniform clearance between the thrust bearing faces and the cylinder wall under varying conditions of operation. The invention is particularly, although not exclusively, of value in connection with aluminum alloy pistons having relatively high expansion characteristics, and a particular purpose of the invention is to provide improved expansion control means for a diverging strut type piston produced from aluminum alloy.

Other objects of this invention will appear in the following description and appended claims, reference being had to the accompanying drawing forming a part of this specification wherein like reference characters designate corresponding parts in the several views.

Fig. 1 is a side elevation, partly in section, illustrating a piston embodying the invention.

Fig. 2 is a horizontal sectional view taken substantially through lines 2—2 of Fig. 1 in the direction of the arrows.

Fig. 3 is a detail vertical sectional view taken substantially through lines 3—3 of Fig. 2 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In one of its preferred forms, herein illustrated by way of example, a piston embodying the present invention is provided with a head 10 including a depending annular side portion 11 provided with suitable ring grooves 12. The head of the piston is provided at diametrically opposed sides with depending integral extensions or hangers 13 into which are cast wrist pin bosses 14 which are provided with the usual wrist pin openings 15, as illustrated. The piston is provided below the head 10 with a skirt which, in the present embodiment, comprises arcuate thrust bearing portions 16 and 16a, the section 16a in the present instance being vertically split from top to bottom by means of a slot 17. The main portions of the skirt sections 16 and 16a are laterally separated from the bosses 14, these sections terminating in an annular bearing ring 18 extending continuously around the lower end of the piston to the slot 17. The bearing ring 18 is disposed below the bosses 14 and separated therefrom by horizontal slots or spaces 19. The skirt sections 16 and 16a are in turn separated from the head 10 by horizontal slots or spaces 20.

In the present embodiment the skirt sections 16 and 16a, together with the split bearing ring 18, are supported from the head of the piston solely by means of pairs of webs or struts 21 and 22. The webs 21, which integrally join the skirt section 16 to the bosses, are angularly disposed so as to extend in a diverging manner from the skirt to the bosses. In like manner the struts or webs 22 extend in diverging relation from the skirt section 16a to the bosses and being cast integrally therewith. It will be seen that the webs or struts 21 are so designed in cross-section as to yield or flex slightly as a result of cylinder wall pressure. The webs or struts 22, on the other hand, are preferably designed so as to have somewhat less yieldability under cylinder wall pressure or forces due to connecting rod side thrust. The webs 22 may be formed in cross-section in the manner illustrated in Fig. 3, each web or strut having a relatively thin wall 22a terminating at the top and bottom in inwardly extending ribs 22b and 22c.

In a preferred embodiment of the invention, the piston is formed of aluminum or aluminum alloy having a relatively high coefficient of expansion. This material is used in the formation of the skirt sections and the struts 21 and 22. In the present instance each of the struts 22 has embedded in the lower rib 22c thereof and adjacent the inner face of said rib an expansion control member 23. The expansion control members 23 are formed of a metal or metal alloy having a relatively lower coefficient of expansion than the aluminum or aluminum alloy used in the formation of the piston. Each expansion control member may be in the form of a heavy steel wire 23 which extends through the rib 22c at the inner edge of the rib, the end 23a of the wire being anchored in the metal beneath the boss 14 by an angular bend therein. The opposite end 23b of the wire is in like manner anchored in the skirt section 16a by an angular bend extending oppositely to the bend 23a. Other suitable methods may be employed to hold and anchor the expansion control members 23 within the ribs 22c of the struts 22, such for example as upsetting the ends thereof, or notching or knurling the entire length of the expansion control member.

The expansion control members 23 are cast in the piston by being placed within the piston mold and are held in place by suitable fixtures during the casting of the piston. In this manner in the completed piston the members 23 become completely embedded in and form integral parts of the struts or webs 22.

Assuming that the metal used in the formation of the piston is a conventional type of aluminum alloy piston metal, it is preferable that the expansion control members 23 in that instance be formed of steel. Steel wire may be satisfactorily utilized, and this wire is preferably located nearer the inner surface of the strut portions 22c than the outer surface of the struts. Hence, the major portion of the wall thickness of the struts, comprising metal having a greater coefficient of expansion, is disposed outwardly of the expansion control members. With this construction it has been found that when the piston is heated an action similar to the action of a bimetallic thermostat is set up in the piston struts 22. This action results from a tendency to greater expansion of the outer portions of the strut walls than the inner ribs 22c. The expansion control members 23, having a relatively lower coefficient of thermal expansion than the metal of the struts lying outwardly thereof, does not expand as rapidly and, therefore, exerts a pull on the more rapidly expanding outer portions of the struts. Due to the outwardly converging relation of the members 23 the forces by said members will be transmitted in such manner as to effect a closing of the slot 17 when the piston is heated. Thus, a circumferential movement of the split skirt sections 16a will be effected tending to close the slots 17 and cause a contraction of the outside circumference of the piston skirt.

In the foregoing particular embodiment of the invention I have disclosed a construction in which a bimetallic thermally responsive member controls and directs the expansion and contracting of the skirt of the piston due to the heating thereof in such a way that the slot 17 is closed or partially so. In this particular embodiment the bimetallic thermally responsive member is formed of two metals, one of which is aluminum or an alloy thereof and the other of which is a metal having a lesser coefficient of thermal expansion than the aluminum or its alloy. Hence, in the present embodiment it is preferred that such metal having the lower expansion characteristics be placed adjacent the inner surface of the thermally responsive strut 22. However, in using different types of metal and in various types of pistons it may be desirable to provide a construction in which the aluminum or the aluminum alloy of the piston has a lower coefficient of thermal expansion than some other metal or its alloy. In this instance the metal having the greatest coefficient of thermal expansion may be incorporated in the strut 22 at a point nearer its outer surface. The action of such bimetallic member is, however, still a bimetallic action and tends to direct the closure of the slot in the piston skirt in substantially the same manner as that heretofore described, and such structure, therefore, is within the purview of the present invention.

I claim:

1. A piston comprising a head, pin bosses, a skirt separated from the head and having a longitudinal slot at one bearing side, and horizontal bimetallic strut members extending from the skirt to the bosses and each comprising a main body formed of the metal of the skirt and an insert formed of a metal of different expansion characteristics so as to exert forces tending to close said slot when the piston is heated, said insert being disposed entirely within the strut.

2. A piston comprising a head, pin bosses, a skirt of aluminum alloy separated from the head and having a longitudinal slot at one bearing side, and horizontal bimetallic strut members extending from the skirt to the bosses and each comprising a main body formed of the metal of the skirt and an insert of ferrous metal anchored therein nearer the inner surface of said body than the outer surface, said insert being disposed entirely within the strut.

3. A piston comprising a head, pin bosses, a skirt of aluminum alloy separated from the head and having a lingitudinal slot at one bearing side, and horizontal bimetallic strut members extending in diverging relation from the skirt to the bosses and each comprising a main body formed of the metal of the skirt and an insert of ferrous metal anchored therein nearer the inner surface of said body than the outer surface and being disposed entirely within the strut.

4. A piston comprising a head, a skirt including an arcuate thrust bearing section, pin bosses, and angularly related struts extending from said section to the bosses, said bearing section being vertically slotted and said struts having inserts disposed entirely therewithin and forming therewith bimetallic members effective to control the closure of said slot upon the heating of the struts.

5. A piston comprising a head, a skirt including an arcuate thrust bearing section, pin bosses, and angularly related struts extending from said section to the bosses, said bearing section being vertically slotted and said struts having inserts of a lesser coefficient of thermal expansion disposed entirely within the struts and forming therewith bimetallic members effective to control the closure of said slot upon the heating of the struts.

6. A piston comprising a head, a skirt including an arcuate thrust bearing section, pin bosses, and angularly related struts extending from said section to the bosses, said bearing section being vertically slotted and said struts having inserts disposed entirely within the struts and forming therewith bimetallic members effective to control the closure of said slot upon the heating of the struts, said inserts being formed of metal having a lesser coefficient of thermal expansion than the metal of the struts and each being located nearer the inner surface of the strut than the outer surface.

7. A piston comprising a head, a skirt including an arcuate thrust bearing section, pin bosses, and angularly related struts extending from said section to the bosses, said bearing section being vertically slotted and said struts having metallic inserts disposed entirely within the struts and anchored therein and formed of a metal having a different coefficient of expansion than the metal of the struts so as to control the closure of said slot when the struts become heated.

RAY E. DAY.